Sept. 5, 1950          W. F. M. GRAY          2,521,513
STATIONARY INDUCTION APPARATUS
Filed Aug. 18, 1948                    4 Sheets—Sheet 1
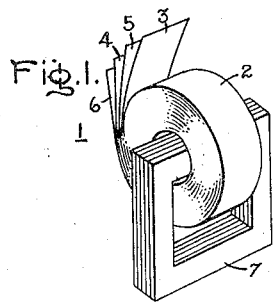
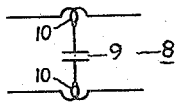
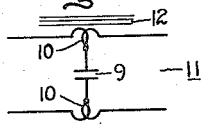
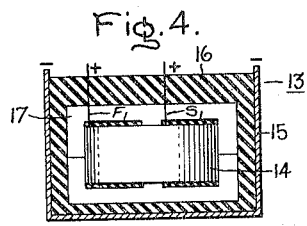
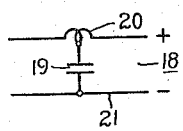
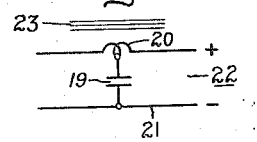
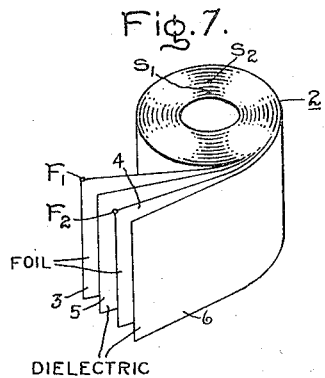
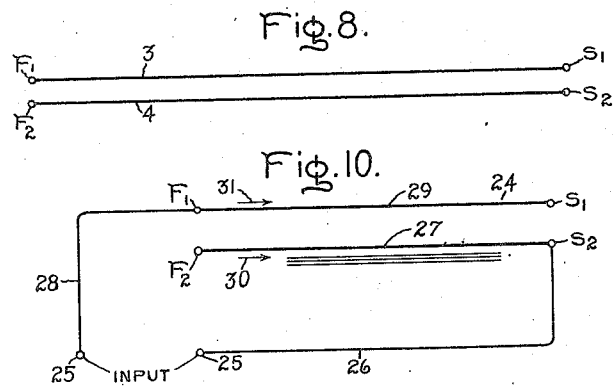
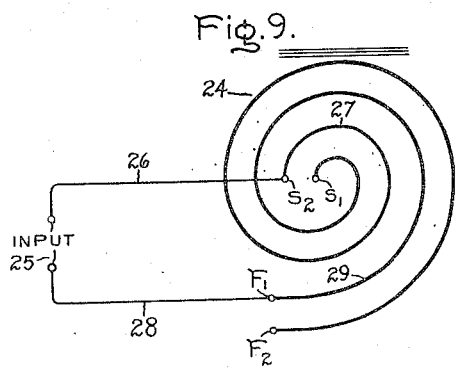
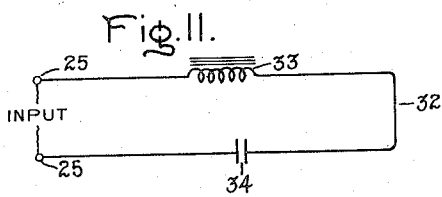
Inventor:
Willard F. M. Gray,
by Ernest C. Britton
His Attorney.

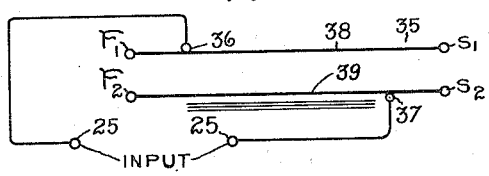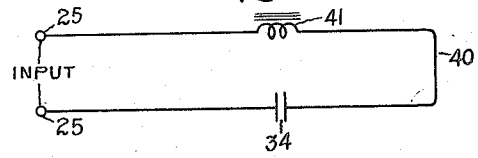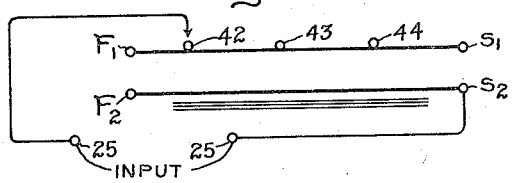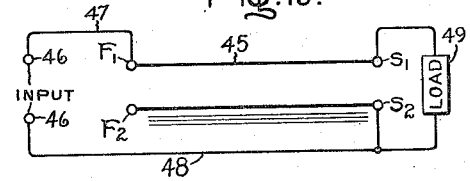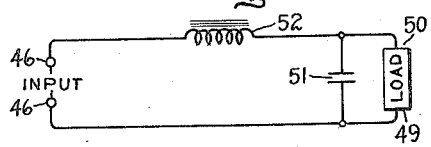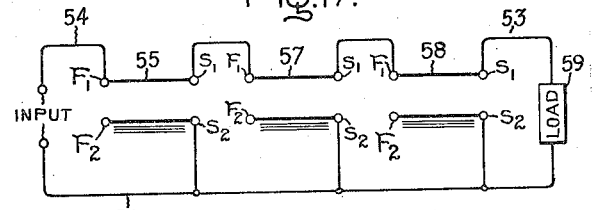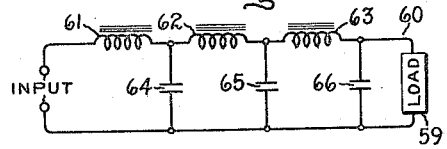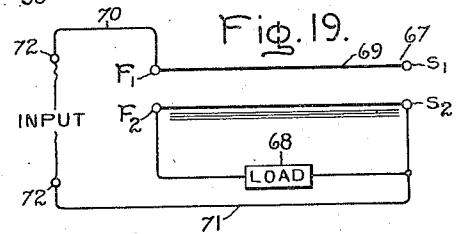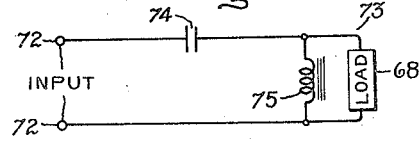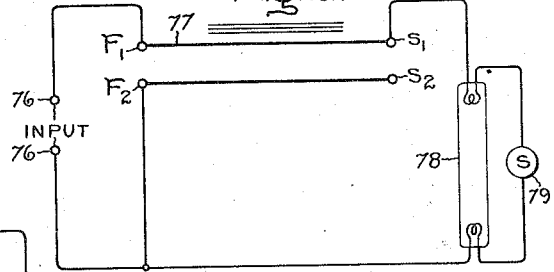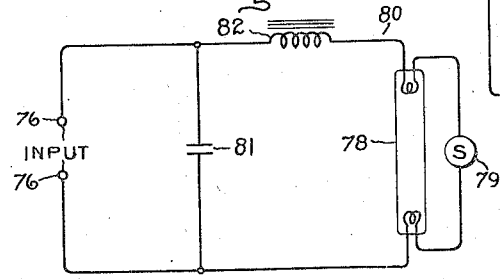

Sept. 5, 1950        W. F. M. GRAY        2,521,513
STATIONARY INDUCTION APPARATUS
Filed Aug. 18, 1948        4 Sheets-Sheet 3
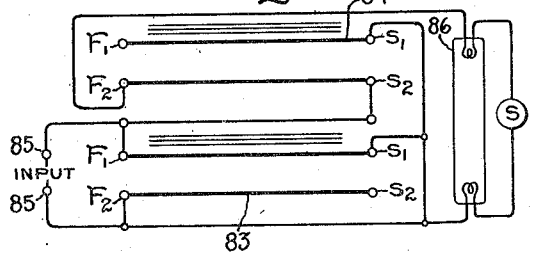
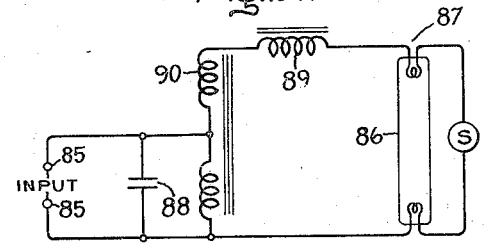
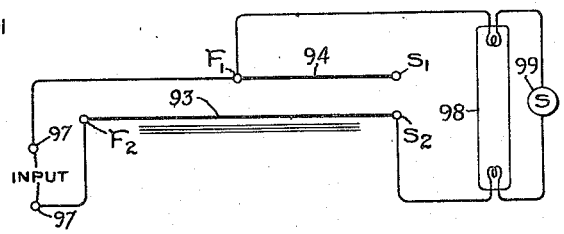
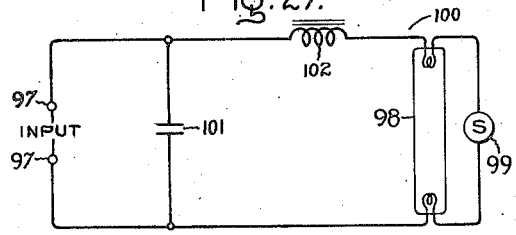
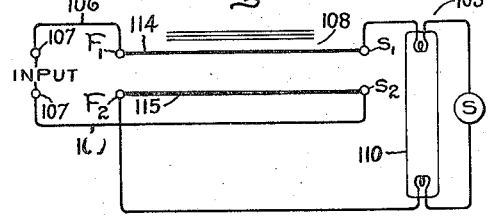
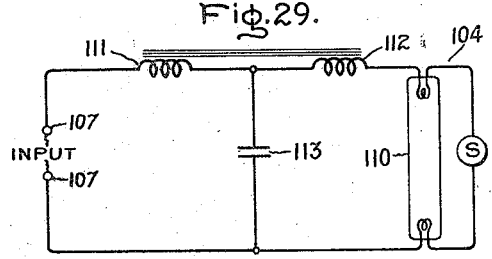
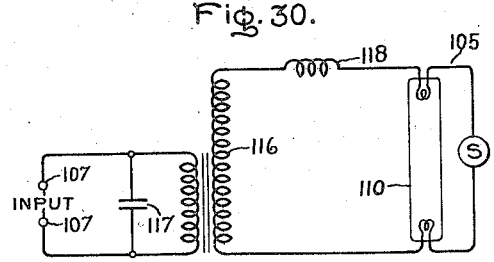
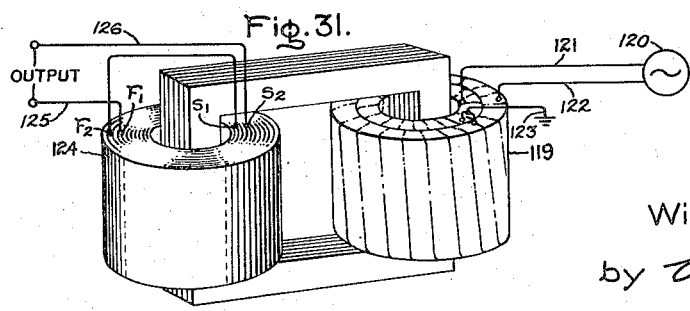
Inventor:
Willard F. M. Gray,
by Ernest C. Britton
His Attorney.

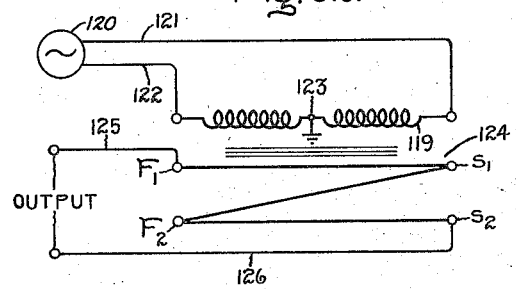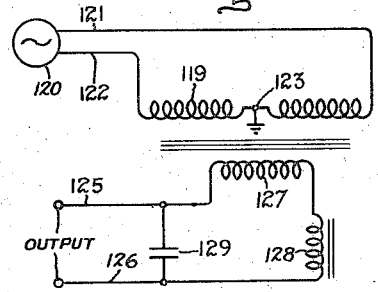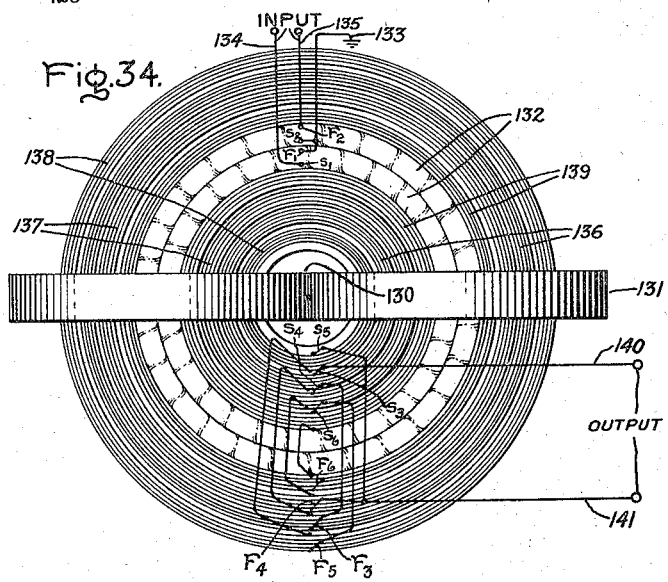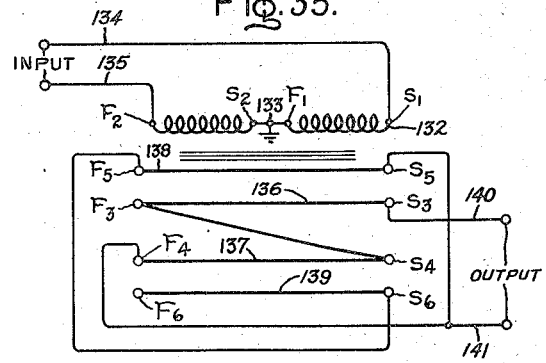

Patented Sept. 5, 1950

2,521,513

UNITED STATES PATENT OFFICE 2,521,513

STATIONARY INDUCTION APPARATUS

Willard F. M. Gray, Pittsfield, Mass., assignor to General Electric Company, a corporation of New York Application August 18, 1948, Serial No. 44,837

2 Claims. (Cl. 315—243)

This invention relates to stationary induction apparatus such as reactors and transformers having significant amounts of both inductive and capacitive reactance.

In circuits utilizing both inductive and capacitive reactance such as resonant circuits, filter circuits, inductive circuits which employ capacitance for power factor correction, etc., the inductive reactance and the capacitive reactance are normally supplied by two separate units. The advantages of incorporating both inductance and capacitance into one unit are apparent; the manufacturing costs are decreased; there is utilization of the same material for two purposes and hence added economy; the weight of the unit is decreased, and it is more compact. In the prior art there are devices, particularly applicable in radio frequency circuits, which utilize the distributed capacity of an inductance for filtering and tuning. Also, the internal inductance of capacitors has been used to limit short circuit currents to a safe value especially in welding apparatus.

This invention discloses a simple, compact and versatile device incorporating significant quantities of both capacitance and inductance wherein the inductance may be varied to meet requirements. Also its use is not limited to high frequency circuits; it may be used advantageously in systems operating at normal power frequencies, and it has particular use in fluorescent lamp circuits and transformer applications.

It is an object of this invention to provide a new and simple compact device possessing, in one unit, significant amounts of both capacitive and inductive reactance. Such a device will be referred to in this disclosure as a "cap-reactor." A cap-reactor may be defined as an electric induction device having at least one electromagnetically inductive winding mounted on a magnetic core, said winding which is constructed of conductive foil is insulated from and in substantially electrostatic inductive relation to a conductive surface. The conductive surface may be, for example, a second foil winding separated from the first winding by a dielectric insulating material or, in the case of an electrolytic cap-reactor, it may be the conductive case which is separated from the first winding by an electrolyte liquid or paste.

It is another object of this invention to provide a cap-reactor which has variable inductance but maintains constant capacitance.

Another object of this invention is to provide a cap-reactor which achieves also a voltage transformation.

A further object of this invention is to provide a cap-reactor, for use particularly in fluorescent lighting circuits, which achieves a voltage transformation with the output voltage being dependent not on the ratio of secondary to primary turns but on the values of cap-reactor inductance, capacitance and line frequency.

Still another object of this invention is to provide a cap-reactor, principally for use as a filter in circuits having a D.-C. component, which possesses a liquid dielectric. An additional object of this invention is to provide power factor correction, reduce in-rush current, and filter out the telephone interference factors in transformers.

The invention will be better understood from the following description taken in connection with the accompanying drawings, and its scope will be pointed out in the appended claims.

In the drawings Fig. 1 is a perspective view of a particular embodiment of the invention; Fig. 2 is a symbolic representation of a cap-reactor; Fig. 3 is a symbol for a magnetic core cap-reactor; Fig. 4 is a schematic drawing of an electrolytic cap-reactor employing an electrolyte liquid or paste; Fig. 5 is a symbolic representation of an electrolytic cap-reactor; and Fig. 6 is a symbol for an electrolytic cap-reactor having a magnetic core; Fig. 7 is a perspective view of a cap-reactor winding as prepared in accordance with this invention; Fig. 8 shows the winding in Fig. 7 as it would appear unwound; Fig. 9 represents the connections to a cap-reactor for obtaining series inductance and capacitance; Fig. 10 is a schematic diagram illustrating the connections in Fig. 9 as they would appear if the cap-reactor coil were unwound; Fig. 11 is the equivalent circuit for the connections shown in Figs. 9 and 10; Fig. 12 is a schematic diagram of a cap-reactor illustrating a modification of Fig. 10; Fig. 13 is the equivalent circuit for the connection shown in Fig. 12; Fig. 14 is a schematic diagram of a cap-reactor possessing taps for obtaining variation of inductance.

Figs. 15 through 20 illustrate the application of cap-reactors to three terminal networks as applied particularly to filter circuits. There is shown in Fig. 15 a schematic diagram of a method of connecting a cap-reactor to achieve a circuit which allows the passage of low frequency alternations and restricts the transmission of high frequency oscillations to the load. The equivalent circuit for the schematic connections shown in Fig. 15 is illustrated in Fig. 16. In Fig. 17 a series of filters, similar to the one shown in Fig. 15, are connected so as to produce the equivalent circuit shown in Fig. 18. Fig. 19 is a schematic diagram of the method of connecting a cap-reactor to a load so as to provide a high pass filter. Fig. 20 is the equivalent circuit for the schematic connections shown in Fig. 19.

The Figures 21 through 27 are three terminal networks having particular application to use as fluorescent lamp ballasts. Fig. 21 illustrates the connection of a cap-reactor so as to provide capacitance across the line terminals. Fig. 22 is the equivalent circuit for the schematic connections shown in the preceding figure. Fig. 23 is a schematic connection of a cap-reactor which achieves an autotransformer effect. Fig. 24 is the equivalent circuit for the schematic connections shown in Fig. 23. Fig. 25 is a perspective view of an alternative construction of cap-reactor. Fig. 26 is a schematic and Fig. 27 an equivalent circuit illustrating an application of the cap-reactor shown in Fig. 25. Fig. 28 illustrates a four-terminal connection of a cap-reactor as applied to use as a fluorescent lamp ballast. The equivalent circuit for Fig. 28 is shown in Figs. 29 and 30.

Figs. 31–35 illustrate the application of cap-reactors to the construction of transformers. Fig. 31 is a perspective view of a transformer having a wire wound primary and a cap-reactor secondary. Figs. 32 and 33 are the schematic and equivalent circuits for the one shown in Fig. 31. Fig. 34 is a top view of a circuit employing a cap-reactor transformer, and Fig. 35 is its schematic representation.

Referring now to the drawings, there is shown in Fig. 1, by way of example, a particular embodiment of this invention as applied to the construction of a fluorescent lamp ballast 1. A fluorescent ballast serves primarily three purposes. It must serve to limit the circuit current since a fluorescent lamp possesses negative resistance characteristics, it must, very often, supply higher than line voltages for lamp operation, and it must supply a high voltage surge for lamp starting. A fourth function which the cap-reactor fluorescent lamp ballast 1 achieves is that of high power factor lamp operation accomplished by the utilization of the built-in capacitance of the cap-reactor. The cap-reactor ballast 1 is constructed of a coil 2 which is wound of two sheets of foil 3 and 4 of conductive material separate by corresponding sheets of dielectric material 5 and 6. The coil 2 is mounted on a core 7 which presents a low reluctance magnetic circuit. The cap-reactor construction shown in Fig. 1 may be considered an inductive reactor having a coil 2 wound of conductive sheets 3 and 4 rather than of wire, or it may be considered a wound capacitor mounted on a low reluctance magnetic core 7. Thus, in one unit, the fluorescent lamp ballast 1 shown in Fig. 1 includes insignificant quantities of both inductive and capacitive reactance. In Fig. 2 is shown a symbol 8 which may be used to represent a cap-reactor; the capacitance 9 of the cap-reactor is shown connected between the inductance 10, thus indicating that both capacitance and inductance are incorporated into one unit. The symbol 11 shown in Fig. 3 may be used to represent a cap-reactor having a magnetic core; the core is shown by the lines 12.

Cap-reactor construction is not limited to units having only solid dielectrics, as shown in Fig. 1. In circuits where it is necessary to filter out the alternating current component of a direct current, it is very often more advantageous to use a cap-reactor having a liquid or paste electrolyte, since higher energy storage capacity per unit volume may be achieved with an electrolytic unit. A cap-reactor 13 incorporating a conductive coil 14, which may be wound of aluminum foil or some similar material, may be mounted in a conductive container 15 which is filled with an electrolyte 16. So as to prevent electrolysis it is desirable that the coil 14 and the container 15 be constructed of the same material. Thus both high inductance and capacitance are achieved; the inductance by the turns of the coil 14 and the capacitance between the coil 14 and the electrolyte 16 to the case 15. The inductive reactance of the electrolytic cap-reactor may be increased by utilizing a low reluctance magnetic core 17 on which the coil 14 may be wound. It should be noted in Fig. 4 that the coil 14 must always be maintained at a positive potential with respect to the case 15. Figs. 5 and 6 illustrate symbols which may be used to indicate an electrolytic cap-reactor 13. As can be seen from the symbol 18 in Fig. 5, the capacitance 19 is represented as being connected between the inductance 20 and ground 21. Symbol 22, as shown in Fig. 6, is very similar to symbol 18 and may be used to represent an electrolytic cap-reactor having a magnetic core; the core is represented by the parallel lines 23.

The coil 2, shown in Fig. 1, is represented in perspective in Fig. 7. When the coil 2 is unrolled or laid out flat and the dielectric sheets 5 and 6 removed, it appears as shown in Fig. 8, where $S_1$ and $S_2$ represent the starts of the coil windings and $F_1$ and $F_2$ represent the finish of the coil windings. The schematic representation and the symbolic figures for cap-reactors have been shown; the Figs. 9 through 35 illustrate some of the circuits in which cap-reactors may be utilized. It should be noted that in most of the succeeding drawings cap-reactors will be shown as illustrated in Fig. 8.

In Fig. 9 a cap-reactor coil 24 is shown connected to an alternating current source of supply 25 in such a manner as to achieve a series connection of inductance and capacitance. One lead 26 from the electrical supply source 25 is fastened to the start, in the illustrated case $S_2$, of one foil 27 and the other lead 28 is fastened to the end or $F_1$ of the remaining foil 29. The circuit of Fig. 9 is shown more clearly in the schematic representation of Fig. 10, also the direction of current flow in both foils is indicated by the arrows 30 and 31 for a particular instant. It can be seen that at any instant the direction of current flow in both foils is the same. The equivalent circuit 32 of Figs. 9 and 10 is shown in Fig. 11 and illustrates the series connection of the inductance 33 and the capacitance 34 of the cap-reactor coil 24. This series connection of inductance and capacitance finds many applications. For example, it may appear in the circuit of one lamp in a two-lamp fluorescent system for the purpose of phase shifting. It also may be used as a series filter which passes one frequency and attenuates all others.

The reason that the cap-reactor coil 24, connected as shown in Fig. 9, is in reality an inductance and a capacitance is, briefly, because the current flows, as shown by Fig. 10, in the same direction in each foil 27 and 29. Therefore, the inductance is not cancelled by the proximity of the conductors. In traveling from $F_1$ in Figs. 9 and 10, around one turn, the foil 29 changes in potential by a voltage proportional to the rate of change of the flux enclosed by the foil 29. The foil 27 in traveling one turn from $F_2$ will enclose almost precisely the same flux because it encloses approximately the same area as one turn of the foil 29. Therefore, it will experience the same change in potential. If, for example, the foils 27 and 29 have a potential difference of 100 volts from $F_1$ to $F_2$ they will have the same, or nearly the same, potential difference after one turn, two turns, or in general at any place along the cap-reactor coil 24. This simply means that regardless of the fact that one end of the foil 29 may be hundreds of volts higher in potential than the other end of the same foil, the two foils 27 and 29 act as a conventional capacitor, because the potential difference between them is the same at every point along the length. The voltage across the capacitor must be defined as that which can be measured between any point on one foil 29 to a point on the other foil 27 which is directly opposite or corresponding. If this definition is kept in mind the capacitance 34 of the equivalent circuit 32 will have the same value as the capacitance of the roll 24 if the roll 24 were connected in the conventional manner.

The reason that the series inductance 33 of the capacitor roll 24 is the same as the inductance measured from one end of a foil to the other end of the same foil is as follows: In Figs. 9 and 10 all of the current flows in at $F_1$ and none at $F_2$. Because there is a constant difference of potential between the coils 29 and 27 all along their length the foil 27 picks up current as a straight line function of its length, and the foil 29 loses current in the same manner. The sum of the currents in the foils 29 and 27 is always constant and is equal to the total current through the unit. Since the foils 29 and 27 are separated, normally, by only a few mils of dielectric material the current from one foil 29 may be assumed to be displaced to coincide with the current in the other foil. Thus it can be considered that all of the current flows through all of the turns of one foil and the inductance may be computed accordingly.

The value of the inductance 33 can be varied independently of the capacitance by varying the position of the tap straps, as shown in Fig. 12. Thus if the cap-reactor roll 35 of Fig. 12 is identical with that shown in Fig. 10 but tap straps 36 and 37 have been added to reduce the effective length of the foils 38 and 39, the capacitance 34 remains the same but the inductance 40 is measured as a linear function of length from one tap strap to the other and its value is reduced accordingly from that shown in Fig. 10. As shown in Fig. 13, which is an equivalent circuit 40 for the schematic connections shown in Fig. 12, the capacitance 34 has remained constant but the inductance 41 has been varied from the value indicated in Fig. 11 for Figs. 9 and 10. Therefore, in one cap-reactor unit, if tap straps are supplied, as shown in Fig. 14 by 42, 43 and 44, and these straps need be fastened to only one foil, variation of inductance may be achieved while the capacitance remains constant.

Figs. 15 to 20 illustrate the application of cap-reactors to three terminal networks primarily for use as high and low pass filters. In Fig. 15 a cap-reactor 45, which may be similar to the one shown in Figs. 9 and 10, is connected so as to achieve a circuit which allows the passage of low frequency current to the load but restricts the transmission of high frequency waves. The input or source of supply 46 is connected so that one input lead 47 is attached to $F_1$ and the other input lead 48 is attached to $S_2$. The load 49, which is to be supplied with filtered current, is connected across $S_1$ and $S_2$. The equivalent circuit 50 for the connections shown in Fig. 15 is illustrated in Fig. 16 and shows the capacitance 51 of the cap-reactor 45 in parallel with the load 49 and the inductance 52 connected in the line leading to both the capacitance 51 and the load 49. A series 53 of such low pass filters may be connected as shown in Fig. 17, an input lead 54 going to $F_1$ of the first cap-reactor unit 55 and the other input lead 56 fastened to $S_2$ of all the cap-reactor units 55, 57 and 58 to be so connected; $S_1$ and $F_1$ of the succeeding cap-reactors 57 and 58 are conductively connected together and the load 59 is placed across $S_1$ and $S_2$ of the final cap-reactor unit 58. The equivalent circuit 60 for the connections in Fig. 17 is shown in Fig. 18, illustrating the series inductances 61, 62 and 63, and the parallel capacitances 64, 65 and 66 which correspond to the cap-reactors 55, 57 and 58. To provide a high pass filter 67, one which limits the flow of low frequency current to the load 68 but allows the passage of high frequency current, a cap-reactor 69 may be connected as shown in Fig. 19. Again the two input leads 70 and 71 from the input supply 72 are connected one to $F_1$ and the other to $S_2$, but in this case the load 68 is connected across $F_2$ and $S_2$. In Fig. 20 the equivalent circuit 73 for the connection shown in Fig. 19, the capacitance 74 is now connected in series with both the inductance 75 and the load 68 which are in parallel.

The construction of magnetic core cap-reactors for utilization in fluorescent lamp circuits to provide necessary current limiting, high voltage, inductive voltages urge, high power factor characteristics is an apparent fertile field of application for this invention. In Fig. 21 the source of power 76 is connected across $F_1$ and $F_2$ of the two foils of a cap-reactor fluorescent ballast 77 having a magnetic core and the fluorescent lamp 78 and its associated starter 79 are connected across $S_1$ and $S_2$. As is shown in Fig. 22, the equivalent circuit 80 for the connections illustrated in Fig. 21, the capacitance 81 is placed across the input line and in parallel with the inductance 82 and the fluorescent lamp 78 which are in series. In this manner, sufficient inductance is provided to provide ballasting and high voltage starting surges; sufficient capacitance is present to provide power factor correction. The application of this type of cap-reactor to fluorescent lamp ballasts is limited to uses not requiring voltage transformation. If a voltage transformation is necessary, two magnetic core cap-reactors 83 and 84 may be connected as shown in Fig. 23 and an autotransformer effect will be achieved. The power source 85 is again connected across $F_1$ and $F_2$ of one unit 83 as well as $S_1$ and $S_2$ of the remaining unit 84. $F_2$ of cap-reactor 83 is also connected to $S_1$ of both units and the fluorescent lamp 86 is connected between $F_2$ of cap-reactor 84 and $S_1$ of both cap-reactors 83 and 84. This produces the equivalent circuit 87 shown in Fig. 24 where the total capacitance 88 is the sum of the capacitance of each of the capacitor rolls. A reactor 89 is shown in the circuit 87 as well as an autotransformer 90 to indicate that the cap-reactors 83 and 84 have sufficient reactance to act as a ballast.

It may be desirable to construct a cap-reactor having a specific value of inductance and a value of capacitance which does not correspond to the value of capacitance which would be achieved if the cap-reactor were wound of two foils of equal length. Thus, as is shown in Figs. 25 and 26 by constructing the reactor coils of foils of different lengths the capacitive and inductive reactances may be varied in relation to one another. The cap-reactor 91 has a coil 92 wound of two foil strips 93 and 94 separated by dielectric insulating material, and the coil 92 is mounted on the central leg 95 of a standard 3-legged magnetic core 96. As can be seen in Fig. 26 one foil 93 is of substantially greater length than the other foil 94. Thus the capacitance is the same as if the length of both foils were equal to the length of foil 94, but the inductive reactance is a function of the length of foil 93. In Fig. 26 the cap-reactor 91 is shown in a circuit similar to that illustrated by Figs. 21 and 22. $F_1$ and $F_2$ are connected to the power source 97, and the fluorescent lamp 98, and its cooperating equipment 99, are connected between $F_1$ and $S_2$. In the equivalent circuit 100 shown in Fig. 27, the capacitance 101 of the cap-reactor 91 is shown placed across the supply 97 and the inductance 102 in series with the fluorescent lamp 98. If the larger foil, foil 93, of Fig. 26 is equal in length to the foils of the ballast 77 shown in Fig. 21 and foil 94 is shorter than foil 93, then the reactance 102 shown in Fig. 27 will be equal to the reactance 82 shown in Fig. 22, and the capacitance 101 will be smaller than the capacitance 81.

The cap-reactor connections 103 shown schematically in Fig. 28 and the equivalent circuits 104 and 105 shown in Figs. 29 and 30 achieve a voltage transformation, but significantly the voltage step-up ratio, the ratio of output to input voltage, is not dependent upon the number of secondary turns in relation to the number of primary turns as in the case of the conventional transformer, but it is a function of the alternating current frequency, the inductance of the ballast, and the capacitance of the coil. In this four-terminal network one lead 106 of the electrical supply 107 is attached to $F_1$ of the cap-reactor 108 and the other lead 109 is attached to $S_2$. The load 110, or in the illustrated case the fluorescent lamp, is connected across $F_2$ and $S_1$. Fig. 29 is the exact equivalent circuit for schematic cap-reactor connections shown in Fig. 28. Here is shown two inductances 111 and 112 having unity coupling as shown by the iron core and a capacitor 113 connected between the junction point of the inductances 111 and 112 and the electrical supply 107. The equivalent circuit 105 shown in Fig. 30, which applies under steady state monocyclic circuit conditions, is not obvious from an examination of the schematic connections 103 of Fig. 28, and it is arrived at on the basis of the following derivation.

Let:

$e$ = applied voltage
$i_r$ = load current
$i_c$ = capacitor current
$e_i$ = induced voltage along one foil
$q$ = charge on capacitor of cap-reactor
$c$ = capacitance of cap-reactor
$R$ = resistance of load
$L$ = inductance of one foil
$f$ = frequency of the alternating supply Upon examination of Fig. 28 and the application of Kirchoff's laws, the applied voltage $e$ must be equal to twice the voltage along one foil, either 114 or 115 of cap-reactor 108, which is $2e_i$ plus the voltage drop through the load 110 or $i_rR$. The induced voltage along one foil, $e_i$, is the inductance of one foil, $L$, multiplied by the rate of change of the sum of the currents in the two foils, or $$e_i = L\left(2\frac{di_r}{dt} + \frac{di_c}{dt}\right) \quad (1)$$

and $$e = 2e_i + i_rR \quad (2)$$

Combining Equations 1 and 2 we get:

$$e = 2L\left(2\frac{di_r}{dt} + \frac{di_c}{dt}\right) + i_rR \quad (3)$$

The charge, $q$, on the capacitor equals the capacitance, $C$, of the cap-reactor 108, multiplied by the capacitor voltage, $e_c$. But the capacitor voltage, $e_c$, equals the applied voltage, $e$, minus the inductive voltage along one foil, $e_i$. Therefore, $$q = Ce_c \quad (4)$$

and $$e_c = e - e_i \quad (5)$$

Substituting Equation 1 in Equation 5 you obtain;

$$e_c = e - L\left(2\frac{di_r}{dt} + \frac{di_c}{dt}\right) \quad (6)$$

and substituting Equation 6 in Equation 4 you arrive at $$q = C\left[e - L\left(2\frac{di_r}{dt} + \frac{di_c}{dt}\right)\right] \quad (7)$$

Also by definition, $$\frac{dq}{dt} = i_c \quad (8)$$

Defining $$\frac{d}{dt} = p \quad \text{and} \quad \frac{d^2}{dt^2} = p^2$$

and differentiating Equation 7

$$i_c = C[pe - L(2p^2i_r + p^2i_c)] \quad (9)$$

Rewriting Equation 3

$$e = 2L(2pi_r + pi_c) + i_rR \quad (10)$$

For the steady state or operating condition let $p = jw$ where $w = 2\pi f$ and $f$ is the frequency of the alternating supply 107, $j = \sqrt{-1}$.

Substituting $p = jw$ in Equations 9 and 10, $$i_c = C[jwe + w^2L(2i_r + i_c)] \quad (11)$$

$$e = 2Ljw(2i_r + i_c) + i_rR \quad (12)$$

Eliminating $i_c$ by algebraic manipulation $$e\left(\frac{1 + w^2LC}{1 - w^2LC}\right) = \frac{4jwL}{(1 - w^2LC)}i_r + i_rR \quad (13)$$

Thus the voltage step-up ratio, as represented by the coefficient of the applied voltage, $e$, is a function of frequency, inductance and capacitance. As seen in the equivalent circuit 105 of Fig. 30, a voltage change is achieved in effect by a transformer 116, power factor is corrected by a capacitance 117, and ballasting is accomplished by a reactance 118.

The Figs. 31–35 show applications of cap-reactors to the transformer field. The characteristics of the cap-reactor which have been previously discussed make it particularly valuable in this application. Transformer power factor may be improved, in-rush current, exciting current and the amount of telephone interference decreased. In Fig. 31 a primary winding 119, which may be prepared in the conventional form as a wire wound coil or it may be wound of foil, is mounted on a low reluctance magnetic core and connected to a source of alternating current 120 through the leads 121 and 122. It may be desirable to have the mid-point of coil 119 grounded as at 123 to prevent excessively high winding to ground voltages. The secondary winding 124 which is mounted on the same low reluctance magnetic core as the primary winding 119 is prepared as a cap-reactor having $S_1$ and $F_2$ connected together and $F_1$ and $S_2$ supplying the load through the output leads 125 and 126. In Fig. 32 the cap-reactor transformer connections of Fig. 31 are shown schematically. In the equivalent circuit shown in Fig. 33, a low voltage secondary winding is represented by coil 127, and the reactance of the cap-reactor coil 124 is illustrated by the magnetic cored coil 128. The capacitance 129 of the cap-reactor 124 is shown across the output leads 125 and 126. By proper adjustment of the capacitance 129 and the reactance 128 power factor may be improved, in-rush current limited, exciting current decreased, and telephone interference made negligible. Obviously, the cap-reactor may serve as the primary and the conventional winding as the secondary.

Fig. 34 shows an arrangement of transformer windings very similar to that shown in Fig. 31 with the addition of an extra capacitor which does not carry any load current and is so placed in the secondary cap-reactor windings as to provide greater capacitance for added power factor adjustment and in-rush current, exciting current and telephone interference corrections. On the central leg 130 of the core 131 are wound a plurality of cap-reactor coils and in this particular example a wire wound primary coil 132 which is wound in two sections connected in series and has its center-top grounded at 133. Alternating current is supplied to the primary 132 through the leads 134 and 135. The secondary of the transformer may be constructed of two cap-reactor coils, 136 and 137, each formed in two sections connected in series. One of each of the sections of the coils 136 and 137 is wound on each side of the wire wound coil 132. Also wound on the core 131 are two additional cap-reactor coils 138 and 139 similarly formed each in two concentric series connected coils. Coils 138 and 139 are so constructed and so connected in the circuit as to provide added capacitance without carrying any appreciable amount of current. In Fig. 35 the transformer connections shown in Fig. 34 are illustrated schematically. The end, $F_3$, of winding 136 is connected to the start, $S_4$, of winding 137. The output leads 140 and 141 are connected to start, $S_3$, of winding 138 and the end, $F_4$, of coil 137, respectively. The start, $S_5$, of coil 138 is also connected to output lead 141 and $F_5$, the end of coil 138, is conductively fastened to $S_6$, the start of winding 139. In this manner a voltage doubler effect is achieved and additional capacitive reactance is incorporated in the circuit.

While there has been shown and described particular embodiments of this invention it will be obvious to those skilled in the art that various changes and modifications can be made therein without departing from the invention, and, therefore, it is aimed in the appended claims to cover all such changes and modifications as fall within the true spirit and scope of the invention.

What I claim as new and desire to secure by Letters Patent of the United States is:

1. In combination, a magnetic core, a plurality of windings on said core, at least two conductive foils insulated from and in substantially electrostatic inductive relation to one another wound on said core and comprising at least two of said windings on said core, at least one conventional wire wound electromagnetically inductive winding on said core, a source of alternating current and a load device, said load device and said source of current being both electromagnetically and electrostatically coupled together by way of said windings, a second group of at least two conductive foils insulated and in substantially electrostatic inductive relation to one another wound on said core, said second group of foil windings providing added circuit capacitance and being coupled to said source of current and said load so as to carry no load current.

2. In combination, a cap-reactor transformer device, a source of alternating current, a load, said cap-reactor transformer device comprising at least one primary coil and a plurality of secondary coils, a closed magnetic core, said primary coil being wound in the conventional manner on said core, each of said secondary coils being constructed of two sheets of conductive foil separated by thin sheets of dielectric material wound many times around said core, a terminal connected to a point on one conductive sheet of said secondary coil, a second terminal connected to the other conductive sheet of said secondary coil at a point which is physically separated from said first point on said first conductive sheet only by said sheets of dielectric material, a third terminal connected to said first conductive sheet of said secondary coil at a point which is many turns removed from said first point to which said first terminal is connected, a fourth terminal connected to said second conductive sheet of said secondary coil at a point which is physically separated from said third point on said first conductive sheet of said secondary coil only by said sheets of dielectric material, said source of alternating current being coupled to said primary coil of said cap-reactor transformer device, said load being coupled to said first terminal and said fourth terminal of the first secondary coil of said cap-reactor transformer device, said second and said third terminals of said first secondary coil being conductively coupled together, said first terminal of said second secondary coil of said cap-reactor transformer device being coupled to said fourth terminal of said first secondary coil, and said second and said third terminals of said second secondary coil being conductively coupled together.

WILLARD F. M. GRAY.

REFERENCES CITED

The following references are of record in the file of this patent:

UNITED STATES PATENTS

| Number | Name | Date |
|---|---|---|
| 1,116,130 | Schiessler | Nov. 3, 1914 |
| 1,389,255 | McDonald | Aug. 30, 1921 |
| 1,460,390 | O'Leary | July 3, 1923 |
| 1,563,426 | Marbury | Dec. 1, 1925 |
| 1,573,852 | O'Leary | Feb. 23, 1926 |

FOREIGN PATENTS

| Number | Country | Date |
|---|---|---|
| 1,573,852 | Great Britain | Feb. 23, 1926 |